United States Patent [19]

Frey

[11] Patent Number: 4,713,811
[45] Date of Patent: Dec. 15, 1987

[54] AUTOMATIC MODE SWITCHING UNIT FOR A SERIAL COMMUNICATIONS DATA SYSTEM

[75] Inventor: Ronald G. Frey, Emerson, N.J.

[73] Assignee: Tytronix Corporation, Englewood, N.J.

[21] Appl. No.: 795,979

[22] Filed: Nov. 7, 1985

[51] Int. Cl.⁴ .............................................. G06F 11/20
[52] U.S. Cl. .......................................... 371/9; 371/11; 364/900
[58] Field of Search ................... 371/9, 8, 11; 364/200 MS File, 900 MS File, 187; 340/825.05

[56] References Cited

U.S. PATENT DOCUMENTS

| | | | |
|---|---|---|---|
| Re. 28,958 | 9/1976 | Zafiropulo | 340/825.05 X |
| 4,035,770 | 7/1977 | Sarle | 364/900 X |
| 4,255,741 | 3/1981 | Peterson | 340/825.05 X |
| 4,347,564 | 8/1982 | Sugano | 371/9 X |
| 4,374,436 | 2/1983 | Armstrong | 371/11 |
| 4,542,479 | 9/1985 | Kamimura | 364/187 X |
| 4,596,982 | 6/1986 | Bahr | 340/825.05 |

*Primary Examiner*—Jerry Smith
*Assistant Examiner*—Robert W. Beausoliel, Jr.
*Attorney, Agent, or Firm*—Rogers, Howell, Moore & Haferkamp

[57] ABSTRACT

An automatic switching unit for use in combination with a backup processor and a series communications system such as for a retail store operation, and where the series communications system includes a controller having multiple serial ports, each port being connected in a series loop with a plurality of data terminals for registering sales transactions. The switching unit includes a monitor for monitoring each of the series loops to detect the malfunction of any port, and also includes a switching network. When the monitor detects a malfunction of any port, the switching network automatically connects the backup processor and all the data terminals in those loops associated with serial ports detected to be malfunctioning in a single series loop, and automatically disconnects the malfunctioning ports from the single series loop. In this way the backup processor is automatically substituted for the malfunctioning ports, and all the data terminals that had been connected to one or more series loops with the malfunctioning ports are automatically connected in a single series loop with the backup processor.

9 Claims, 18 Drawing Figures

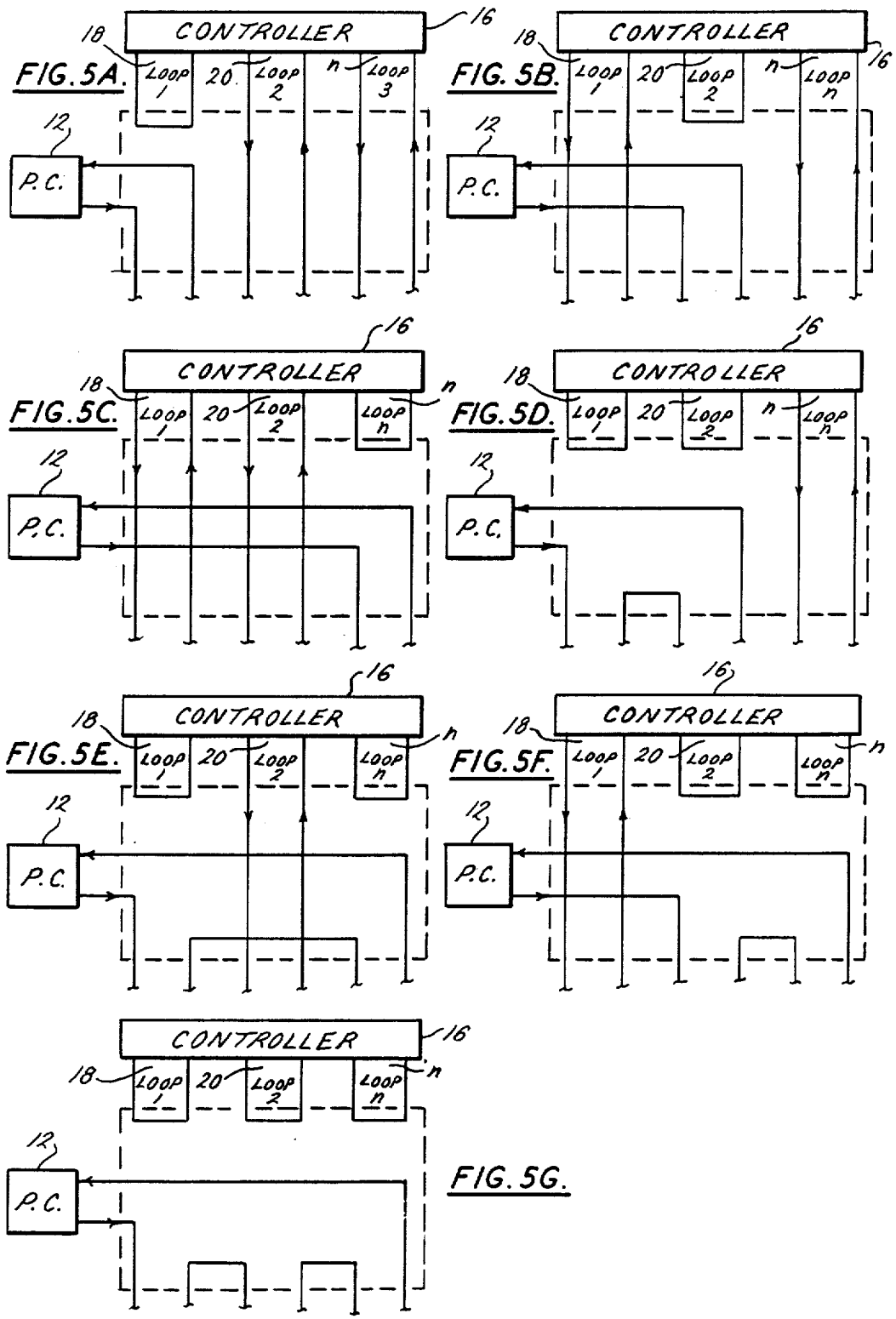

AUTOMATIC MODE SWITCHING UNIT FOR A SERIAL COMMUNICATIONS DATA SYSTEM

BACKGROUND AND SUMMARY OF THE INVENTION

This invention relates to an automatic switching unit for use in a series communications system such as those for retail store operations. More particularly, this invention allows the use of a relatively inexpensive processor such as a PC as a backup for a controller, that may also be a PC or a substantially more expensive processor, in a series communications system such that the processor may be used in any one of several modes of operation.

The automatic switching unit of the present invention has utility in a specific area of data communications technology. It is now common for retail stores to use cash registers which are actually computer terminals connected in a series loop with a controller. Data communications take place between each of the terminals and the controller relating to sales transactions that occur at each terminal. One such system is marketed by IBM with its controller designated as an IBM 3651. This controller has four input/output serial ports, with each port having the capacity for connecting up to sixty-four terminals in a series loop with that port. Typically, three of these ports are used for series loop communication, such that there may be three loops, each with sixty-four terminals connected in series, and the fourth port is typically used with a modem for telephone link communication with a central computer. Even where a store needs fewer than sixty-four terminals (cash registers), they are preferably connected in more than one series loop so that if one of the ports malfunctions, not all of the cash registers are inoperative so that the store may continue to function.

One of the problems with such serial communications systems was that because the terminals and controller ports are connected in series, if one of the terminals malfunctioned, the entire loop would become inoperative. It is analogous to the old series strand of Christmas tree lights, where if one light burned out, all of the lights would go out. This problem was solved by the invention of U.S. Pat. No. 4,245,343 of the same inventor as the present invention. That patent discloses a system whereby defective terminals are automatically bypassed, regardless of the number of malfunctioning terminals, to maintain operation of the loop and other terminals so that the store may continue operations with little disruption.

While the invention of the referenced patent addressed and solved primarily the problem of malfunctioning terminals, the present invention addresses and solves the problem of one or more malfunctioning ports at the controller.

A controller port failure can be a serious problem because all of the terminals in that loop become inoperative. There is no data communication between a defective port and the terminals. The terminals can be used as cash registers with a paper tape to record the transactions, but there are no transactions being recorded in memory at the controller. The daily transactions of the terminals associated with the defective port must be manually loaded in the controller after it again becomes functional, which is a very time consuming task. Also, if the terminals are powered off, and the controller port is defective, the terminals will not operate at all when powered on. Under such conditions the terminals will not even ring up a sale. This is because the terminals loose their memory and they have no battery backup. This latter condition is not uncommon. It can occur where the power to the system is turned off at the end of the day, and when turned on the next day a controller failure occurs.

It had been recognized that a relatively inexpensive PC might be used as a backup or substitute for the controller. An example of such a PC is the IBM PC XT or AT. The backup PC may have all the capabilities of the controller, which also may be a PC, but should at least have data logging capabilities so that transactions can be stored in the PC and then later transferred to the controller when operable without the need for time consuming manual loading of all the daily transactions. It had also been recognized that such a backup PC might also be used for other purposes, for example as an administrative terminal or security monitor, when not in use as a backup for the controller as controller failures are infrequent although very serious. However, a way to use the backup processor so as to be effective in maintaining serial loop operations had not been recognized.

While it would be possible to manually connect the PC in the series loop and disconnect the malfunctioning controller ports, such an approach is impractical. This is because store personnel do not have the expertise to determine the cause of the failure and to make the necessary connections to properly substitute the PC for the defective controller ports. Rather than solving the problem with the backup PC, the store personnel may actually make it worse due to their inability to properly diagnose the problem and make the necessary corrections.

The present invention solves these problems by providing an automatic switching unit that detects controller port failures and automatically substitutes the PC for the defective ports so that all the store terminals remain operative and all the data transactions are stored in the PC. The automatic switching unit of the present invention also enables use of the PC as either a monitor or an administrative terminal if not used as a substitute for one or more defective ports.

Generally, the unit of the present invention includes a monitor for monitoring each of the series loops to detect the malfunction of each port. A switching network comprised of relays is operated by a relay control, which in turn operates in response to the monitor. When the monitor detects that one or more ports is malfunctioning, the switching network is operated in a backup or data logger mode to automatically connect the backup processor and all the data terminals in those loops associated with serial ports detected to be malfunctioning in a single series loop, and automatically disconnect the malfunctioning ports from the loop.

For example, assuming the controller has three serial ports each connected in a series loop, if one port is defective, the automatic switching unit automatically disconnects the store loop from the defective controller port. The controller port is wrapped (input and output terminals connected together), and the backup processor is substituted as the controller for that store loop. If two controller ports fail, the automatic switching unit automatically disconnects both store loops from the defective controller ports, wraps both ports, serializes the two store loops to make one large series loop, and connects this single large loop to the backup processor.

If all three serial ports fail, the automatic switching unit automatically disconnects all three loops from the defective controller ports, wraps all three ports, serializes all three loops to make one large loop, and connect this single large loop to the backup processor. While operating in this mode, the monitor continues to monitor the malfunctioning ports, and for any port where the failure is corrected, the automatic switching unit automatically reconnects to that port the data loop associated therewith, while the terminals associated with defective ports remain connected in series with the backup processor. In this way, the switching device automatically reinstates the loops to the controller as failures are corrected.

In addition to the backup or data logger mode, the automatic switching unit of the present invention allows use of the backup processor or PC in an administrative terminal mode or a security monitor mode. In the administrative terminal mode, the operator is permitted to use the PC in any loop to function as an administrative terminal whereby store reports and other data may be collected and printed. In the security monitor mode, the operator is permitted to use the PC as a passive data monitoring device on any loop. The switching device will connect the PC to the end of the selected loop. In this mode, the PC does not need a loop address and the loop is not broken. The data flow on the selected loop is simply monitored by the PC with no interaction. This function is useful for security monitoring in the store. The PC can display a register's paper tape on the CRT screen to monitor the transactions at a particular register or terminal.

Other features of the invention include an alarm to indicate that a malfunction has occurred, and the ability to wrap (connect the input and output leads together), the PC and the controller ports for diagnostic testing.

Hence, the present invention provides a relatively inexpensive backup processor for a serial communications system controller with continuous monitoring of the ports and automatic substitution of the backup processor upon detection of a malfunction. The switching device of the present invention also permits use of the backup processor for other purposes such as an administrative terminal or a security monitor, if not in use as a backup processor. These and other objects and advantages of the invention are apparent from the drawing and detailed description to follow.

DESCRIPTION OF THE DRAWINGS

FIGS. 5A through 5G are schematic block diagrams showing the various possible connections of the PC with the switching unit operating as a backup processor in the backup or data logger mode;

DETAILED DESCRIPTION OF PREFERRED EMBODIMENTS

Figure 1:
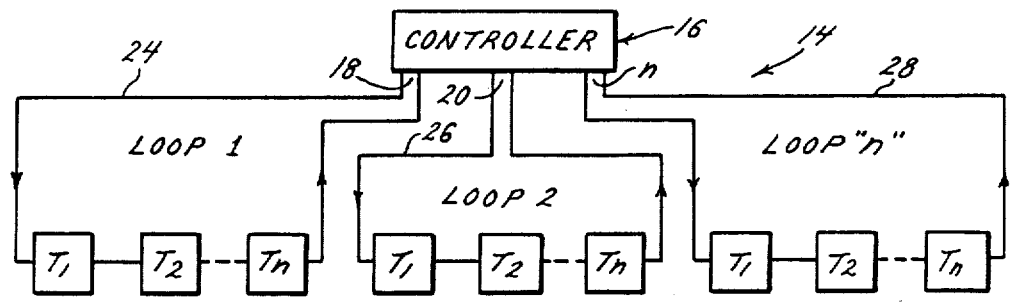
FIG. 1 is a block diagram showing schematically a typical serial communications system having multiple serial loops.

With reference to the drawing, there is shown an automatic mode switching unit 10 of the present invention for use in connecting a backup processor such as a PC 12 to a serial communications system 14. With particular reference to FIG. 1, labeled "Prior Art", the serial communications system 14 of the type well known in the art includes a controller 16 having a plurality of serial ports 18, 20, and n which are connected to series data loops 24, 26, and 28, respectively. These loops are also labeled loop 1, loop 2, etc. to loop n as shown. Within each loop is connected in series a number of data terminals T1, T2, ... Tn. These data terminals are of the type used in retail stores and are commonly referred to by the general public as "cash registers". As previously noted, these terminals are located throughout the store at various check out locations. All of the terminals in a given loop are connected in series with a controller port such that data is transferred between the controller and the terminals through the series loop circuit. A system of the type shown in FIG. 1 is marketed by IBM with the controller designated as a 3651 or 3684 and each terminal designated as a 3653 or 3683. The controller may also be a suitably programmed PC or other processor.

As previously mentioned, one of the problems with the system of FIG. 1 was that if any one or more of the terminals in a series loop became defective so that it would not pass data, the entire loop became inoperative. It is not uncommon for there to be as many as sixty-four terminals connected in series in a single loop, so that if one terminal became defective this resulted in sixty-four of the terminals throughout the store becoming inoperative. This problem was solved by the automatic bypassing unit which is the subject of U.S. Pat. No. 4,245,343.

Figure 2:
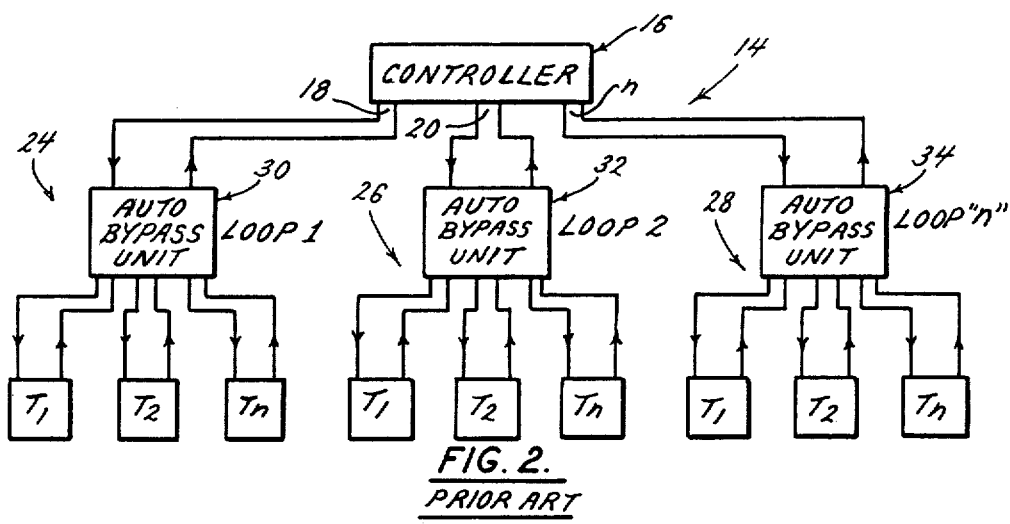
FIG. 2 is a schematic block diagram of the system of FIG. 1, but also including the automatic bypass units which are the subject of U.S. Pat. No. 4,245,343.

FIG. 2, also labeled "Prior Art", shows the serial communications system of FIG. 1, but including automatic bypassing units 30, 32, and 34 in accordance with the referenced patent. In a typical installation, the controller and automatic bypass units are located in close physical proximity, while the terminals of the various loops are located throughout the store. It will be noted that the terminals are connected into the automatic bypassing units with the use of "home run" wiring. Although the terminals are electrically connected in series as is depicted in FIG. 1, the actual wiring of the terminals to the automatic bypassing units as shown in FIG. 2 is such that the wiring goes out to terminal 1 from the bypass unit, then from terminal 1 back to the bypass unit, then from the bypass unit back out to terminal 2, then from terminal 2 back to the bypass unit, and so on.

Figure 3:
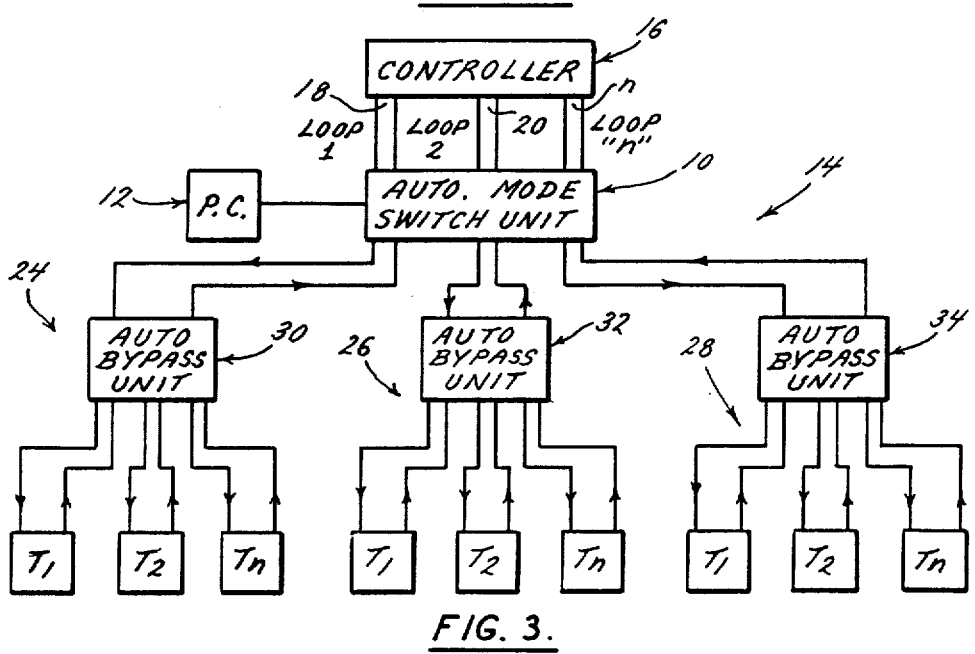
FIG. 3 is a schematic block diagram of the system of FIG. 2, but also including the automatic switching unit of the present invention.

FIG. 3 shows the system of FIG. 2, but with the automatic mode switching unit 10 of the present invention and the PC 12 connected between the controller and the automatic bypassing units. In a typical installation, the automode switching unit and PC are physically located in close proximity with the controller 16 and automatic bypassing units.

Figure 4:
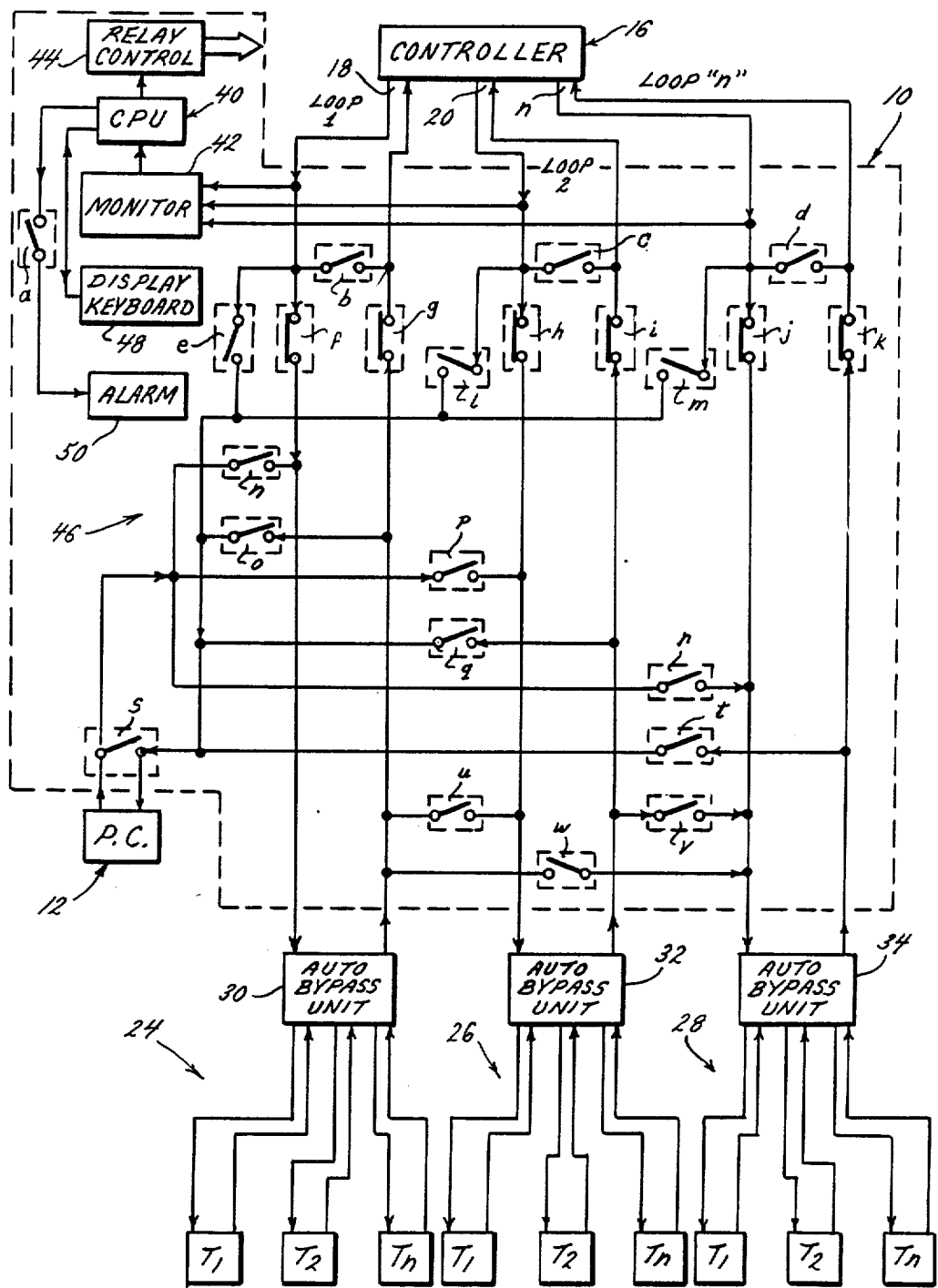
FIG. 4 is a diagram similar to FIG. 3 but schematically showing the automatic switching unit of the present invention in more detail including the various relays that function to place the backup PC in the system depending on the mode of operation.

FIG. 4 shows the same system as shown in FIG. 3, but with the automode switching unit shown in more detail. Hence, with reference to FIG. 4, the automode switching unit 10 includes a CPU 40, a data monitor 42 having leads connected to the output leads from the controller ports to monitor those ports for malfunctions, and a relay control 44 for operating selected relays in a relay network 46 which includes relays (switches) a through w. The switching unit also includes a display/key board 48, and an alarm 50.

Data monitors are known in the art, and the monitor 42 may look for particular data in order to determine whether a controller port is malfunctioning. In the case of the IBM 3651 controller, that controller periodically generates a data flag, so that the data monitor 42 may look for that flag, and if it is absent for a selected period of time, it is an indication that the port is defective. With such controllers, a data flag is generated at each port, and it is possible that any number of the ports may become defective.

OPERATION

The automatic switching unit of this invention has several modes of operation. These include the backup or data logger mode, the administrative terminal mode, and the security monitor mode. There are also included "wrap" modes for both the controller and PC.

BACK-UP OR DATA LOGGER MODE

In this mode the switching unit will automatically detect a port malfunction, and substitute the PC for the controller so that the terminals associated with the malfunctioning ports are connected in a single series loop with the PC. FIGS. 5A through 5G show the various connections depending on which of the controller ports malfunction.

The monitor 42 monitors each of the data loops near the output terminal of each port to detect whether the port is malfunctioning. In the case of the IBM 3651 controller, the data monitor looks for a periodically generated data flag at each port of the controller, and interprets the absence of the data flag for a specified period of time as an indication that the port is malfunctioning or defective.

Assuming that the data monitor detects a malfunction at port 18, signals are sent to the CPU 40 from the data monitor, which in turn sends signals to the relay control 44 causing the relay controls to operate the relay network 46 to place the relays in a condition resulting in the connections shown in FIG. 5A. Hence, in response to the data monitor detecting a malfunction at the port 18, the input and output terminals of port 18 are wrapped (connected together), and the PC is connected in series with the loop 1 terminals. Ports 20 and n and their associated terminals remain unchanged, as these ports remain operative. The result is that the PC is substituted for the malfunctioning port 18 of the controller as shown in FIG. 5A. FIGS. 5B and 5C show the similar condition where ports 20 and n, respectively, malfunction.

FIG. 5D shows the condition where both ports 18 and 20 malfunction. Under this condition, the data monitor detects the malfunction of both ports and sends signals to the CPU, which in turn sends signals to the relay control to cause the relay network to make the connections shown in FIG. 5D. Under these conditions, each of ports 18 and 20 is wrapped, the loop 1 and loop 2 terminals are serialized to form a single series loop with all of the loop 1 and loop 2 terminals, and with the PC. Hence, the PC is substituted for both ports 18 and 20, and is connected in a single series loop with all of the loop 1 and loop 2 terminals. FIGS. 5E and 5F show similar connections where ports 18 and n, and 20 and n, respectively, malfunction. In each case, it will be noted that the port that is not defective remains operable and connected in its associated series loop.

FIG. 5G shows the condition where all of the ports malfunction. Here, each of the ports is wrapped, and all of the terminals of all of the loops are serialized and connected in a single series loop with the PC. Hence, the PC is substituted for all of the controller ports and connected in series with all of the terminals.

During the time that any one or more ports is malfunctioning, the data monitor continues to monitor the ports. If any of the ports become operative as detected by the data monitor, appropriate signals are sent from the data monitor to the CPU, and in turn to the relay control, to operate the relay network and place the now operative ports back in operation with the terminals of their respective loops. Only the ports that become operable are placed back into operation, the malfunctioning ports remaining wrapped with the PC substituted therefor. For example, if ports 18 and 20 malfunction resulting in the circuit condition of FIG. 5D, and if port 18 becomes operational as detected by the data monitor, port 18 will again be connected with the loop 1 terminals, and port 20 will remain wrapped with the PC substituted therefore to result in the condition shown in FIG. 5B.

Also, when any malfunction is detected at any of the ports, the CPU operates a relay to an alarm 50, and the display 48 will indicate the malfunctioning ports.

Figures 6A, 6B:
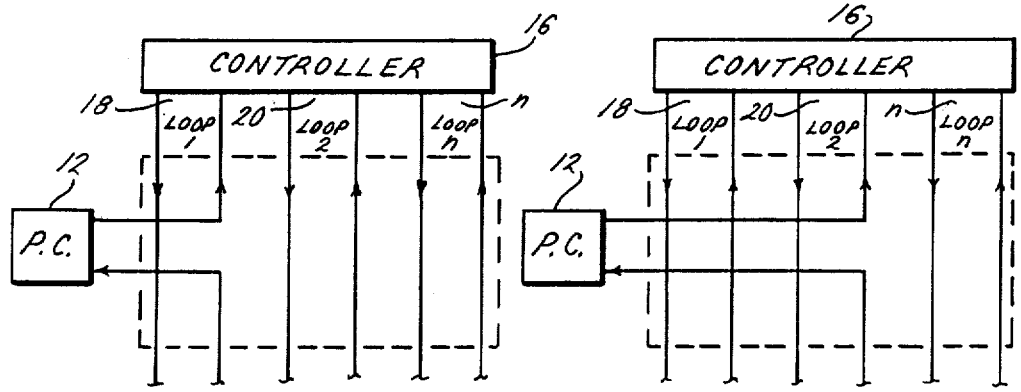
FIGS. 6A through 6C are schematic block diagrams showing the various possible connections of the PC with the switching unit operating in the administrative terminal mode.
Figures 6C, 7A:
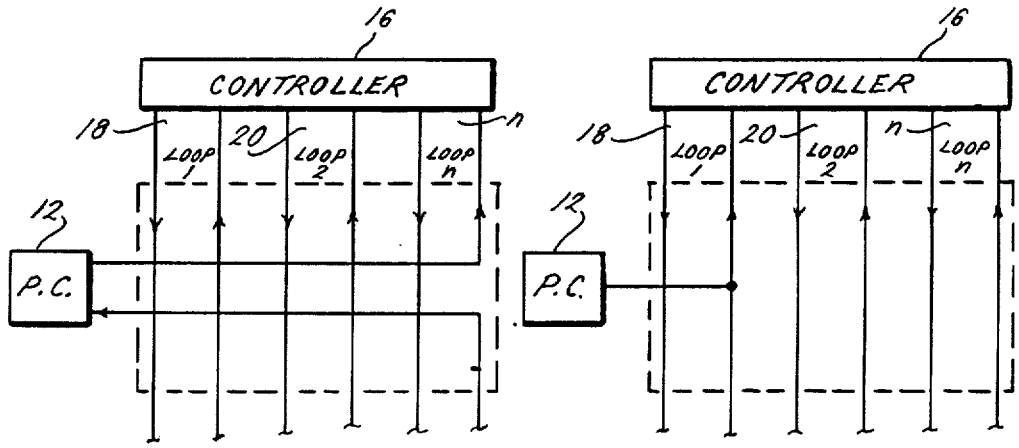
FIGS. 7A through 7C are schematic block diagrams showing the various possible connections of the PC with the switching unit operating in the security monitor mode.
Figures 7B, 7C:
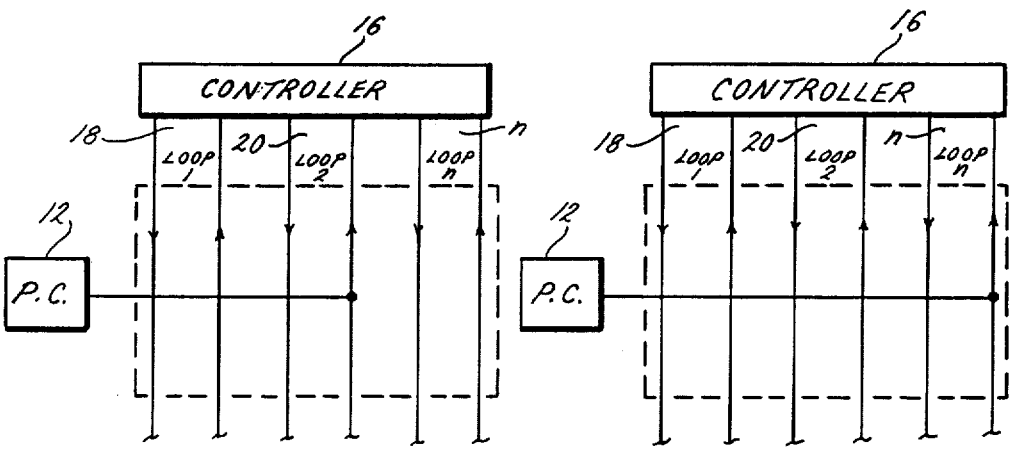

It should be noted, that in the backup or data logger mode, the entire operation is automatic. In other words, if any malfunction of any port occurs, the PC is automatically substituted for the defective ports, and there is no action required by an operator for this to occur. To the contrary, a primary feature of the invention is that operator action is not required in this mode. Also, the unit of this invention will automatically operate in this mode even if at the time the malfunction occurs it was operating in one of the other modes. After all malfunctions are corrected, the switching unit will automatically revert back to the mode that it was in before the malfunction occurred. For example, if it had been operating in the administrative terminal mode as shown in FIGS. 6A through 6C, or in the security monitor mode as shown in FIGS. 7A through 7C, it will automatically revert to that mode after all the malfunctions are corrected.

This mode of operation is extremely beneficial. Even if the backup PC does not have all of the capability of the controller, it at least has data logging capabilities so that all of the terminal transactions are stored in the PC and can be later transferred to the controller when made operable. The time consuming manual loading of the transactions into the controller is eliminated. Also, the PC can load the terminals each day with the programs necessary for them to operate as registers.

ADMINISTRATIVE TERMINAL AND SECURITY MONITOR MODES

When the PC is not being used as a backup processor in the backup mode, which is the majority of the time, it can be used for other functions. Two such functions are as an administrative terminal and as a security monitor. These modes are semi-automatic in that to place the unit in one of these modes the operator presses a key on the keyboard 48.

In the administrative terminal mode, the switching unit is operated to place the PC in series with the other terminals of a given loop, so that store reports and other data may be collected and printed with the PC. These connections are shown in FIGS. 6A through 6C where the PC is connected in series in loops 1, 2, and n, respectively.

In the security mode, the PC is connected to the end of a selected loop to monitor the transactions of any terminal in that loop. These connections are shown in FIGS. 7A through 7C where the PC is connected to loops 1, 2, and n, respectively. This mode is also semi-automatic in that keyboard operation by an operator is required to place the unit in this mode. Here it operates as a passive data monitoring device. The PC is connected at the end of the loop with a two wire connection. The PC does not need a loop address. The loop is not actually broken. The PC is simply monitoring the data flow on the loop and not interacting with it. For example, this function may be used for security monitoring to guard against employee theft at the registers. The PC can display a suspected register's paper tape on the CRT screen.

WRAP MODE

By keyboard operation, the operator can place the unit in a wrap mode where the PC is wrapped, such as for the purpose of diagnostic testing of the PC itself, or where all of the ports are wrapped, or both.

Figure 8:
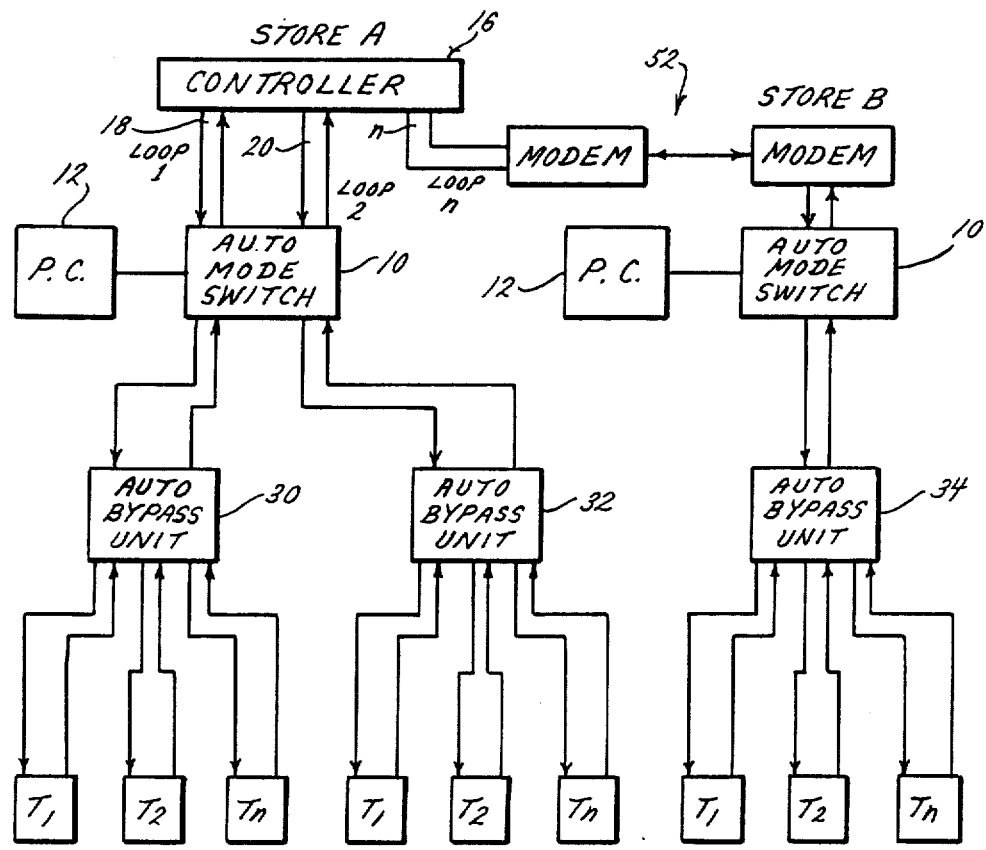
FIG. 8 is a schematic block diagram showing another embodiment of the invention where one of the output ports of the controller is connected through a modem and telephone communication link to terminals in another store.

In FIG. 8 there is shown another embodiment of the invention where the controller, an automode switch 10, PC 12, automatic bypass units 30 and 32, and terminals for loops 1 and 2 are in store A, and a second automode switch 10, PC 12, autobypass unit 34, and terminals for loop n are located in store B. The store B loop is connected to port 22 through a modem and telephone link 52. In this embodiment, the automode switch 10 of store A operates to place the PC of store A in any one of the several modes for loops 1 and 2. The automode switch 10 in store B operates to place the PC of store B in any one of the several modes for loop n. The data monitor of the automode switch in store A monitors both ports 18 and 20, while the data monitor for the automode switch in store B monitors port n.

The automode switch of the present invention also has manual capability such that the unit may be manually placed in any mode condition as shown in FIGS. 5, 6, and 7 and as explained above by pressing a designated key on the keyboard 48. The mode condition in which the unit is operating, whether by automatic or manual operation, is shown on the display 48.

There are various changes and modifications which may be made to applicant's invention as would be apparent to those skilled in the art. However, these changes or modifications are included in the teaching of applicant's disclosure, and it is intended that the invention be limited only by the scope of the claims appended hereto.

I claim:

1. An automatic switching unit for use in combination with a backup computer and a series communications system such as for retail store operations, and where the series communications system includes a controller having multiple serial ports, each port being connected in a series loop with a plurality of data terminals for registering sales transactions, there being a plurality of such series loops, said switching unit comprising:
   a monitor for monitoring each of the series loops to detect a malfunction of any port;
   a switching network connected between the controller, backup processor, and data terminals;
   means for operating the switching network in a first operating mode in response to the monitor detecting a malfunction of any port for automatically connecting the backup processor and all the data terminals in those loops associated with serial ports detected to be malfunctioning in a single series loop, and for automatically disconnecting the malfunctioning ports from the single series loop;
   means for operating said switching network in a second mode of operation for connecting the processor in a selected series loop in series with the terminals and serial port of that loop; and
   means for operating said switching network in a third mode of operation for connecting the processor in a selected series loop to monitor terminal transaction;
   said switching network being operable in said second or third mode of operation only when said monitor does not detect a malfunction;
   whereby, upon the monitor detecting that one or more serial ports is malfunctioning, the processor is automatically substituted for the malfunctioning ports, and all of the data terminals that had been connected in one or more series loops with the malfunctioning ports are automatically connected in a single series loop with the processor, and further whereby if the detector does not detect a malfunction, the device may be operated in either the second or third mode.

2. The automatic switching unit of claim 1 wherein after a malfunction, the monitor continues to monitor each malfunctioning port, and means for operating the switching network upon the monitor detecting that a previously malfunctioning port has become functional for reconnecting said now functional port back in the series loop with the terminals with which it was associated, said processor remaining substituted for any malfunctioning ports.

3. The automatic switching unit of claim 2 wherein when all malfunctioning ports are again functional, said unit is automatically placed back in the operating mode it was in prior to a malfunction being detected.

4. An automatic switching unit for use in combination with a backup processor and a series communications system such as for retail store operations, and where the series communications system includes a controller having multiple serial ports, each port being connected in a series loop with a plurality of data terminals for registering sales transactions, there being a plurality of such series loops, said switching unit comprising:
   a monitor for monitoring each of the series loops to detect a malfunction of any port;

a switching network connected between the controller, backup processor, and data terminals;

means for operating the switching network in response to the monitor detecting a malfunction of any port for automatically connecting the backup processor and all the data terminals in those loops associated with serial ports detected to be malfunctioning in a single series loop, and for automatically disconnecting the malfunctioning ports from the single series loop;

whereby, upon the monitor detecting that one or more ports is malfunctioning, the processor is automatically substituted for the malfunctioning, ports, and all the data terminals that had been connected in one or more series loops with the malfunctioning ports are automatically connected in a single series loop with the processor; and means for operating said switching network, only if the monitor does not detect a malfunction, for connecting the processor in a selected series loop in series with the terminals and port of that loop.

5. An automatic switching unit for use in combination with a backup processor and a series communications system such as for retail store operations, and where the series communications system includes a controller having multiple serial ports, each port being connected in a series loop with a plurality of data terminals for registering sales transactions, there being a plurality of such series loops, said switching unit comprising:

a monitor for monitoring each of the series loops to detect a malfunction of any port;

a switching network connected between the controller, backup processor, and data terminals;

means for operating the switching network in response to the monitor detecting a malfunction of any port for automatically connecting the backup processor and all the data terminals in those loops associated with serial ports detected to be malfunctioning in a single series loop, and for automatically disconnecting the malfunctioning ports from the single series loop;

whereby, upon the monitor detecting that one or more ports is malfunctioning, the processor is automatically substituted for the malfunctioning ports, and all the data terminals that had been connected in one or more series loops with the malfunctioning ports are automatically connected in a single series loop with the processor; and means for operating said switching network only if the monitor does not detect a malfunction, for connecting the processor in a selected series loop to monitor terminal transactions.

6. An automatic switching unit for use in combination with a backup processor and a series communications system such as for retail store operations, and where the series communications system includes a controller having multiple serial ports, each port being connected in a series loop with a plurality of data terminals for registering sales transactions, there being a plurality of such series loops, said switching unit comprising:

a monitor for monitoring each of the series loops to detect a malfunction of any port;

a switching network connected between the controller, backup processor, and data terminals;

means for operating the switching network in response to the monitor detecting a malfunction of any port for automatically connecting the backup processor and all the data terminals in those loops associated with serial ports detected to be malfunctioning in a single series loop, and for automatically disconnecting the malfunctioning ports from the single series loop;

whereby, upon the monitor detecting that one or more ports is malfunctioning, the processor is automatically substituted for the malfunctioning ports, and all the data terminals that had been connected in one or more series loops with the malfunctioning ports are automatically connected in a single series loop with the processor; and means for automatically wrapping each malfunctioning port in response to the monitor detecting its malfunction.

7. An automatic switching unit for use in combination with a backup processor and a series communications system such as for retail store operations, and where the series communications system includes a controller having multiple serial ports, each port being connected in a series loop with a plurality of data terminals for registering sales transactions, there being a plurality of such series loops, said switching unit comprising:

a monitor for monitoring each of the series loops to detect a malfunction of any port;

a switching network connected between the controller, backup processor, and data terminals;

means for operating the switching network in response to the monitor detecting a malfunction of any port for automatically connecting the backup processor and all the data terminals in those loops associated with serial ports detected to be malfunctioning in a single series loop, and for automatically disconnecting the malfunctioning ports from the single series loop;

whereby, upon the monitor detecting that one or more ports is malfunctioning, the processor is automatically substituted for the malfunctioning ports, and all the data terminals that had been connected in one or more series loops with the malfunctioning ports are automatically connected in a single series loop with the processor;

wherein after a malfunction, the monitor continues to monitor each malfunctioning port; and means for operating the switching network upon the monitor detecting that a previously malfunctioning port has become functional for automatically reconnecting said now functional port back in the series loop with the terminals with which it was associated, said processor remaining substituted for any malfunctioning ports.

8. The automatic switching unit of claim 7 wherein said monitor operates said switching network in response to detecting the absence of a data flag in a serial loop within a specified time period, the data flag being generated by the controller at each port.

9. The automatic switching unit of claim 7 further comprising means for automatically actuating an alarm upon detecting a malfunction.

* * * * *